May 12, 1931.  W. H. SYMONDS  1,804,714
STAND PIPE CONNECTION FOR BUILDINGS
Original Filed March 4, 1927
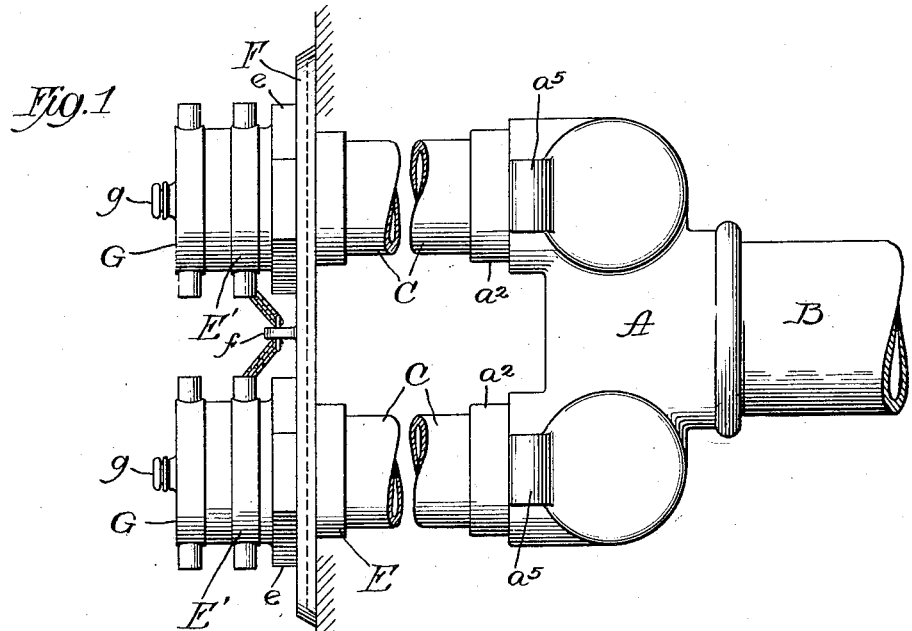
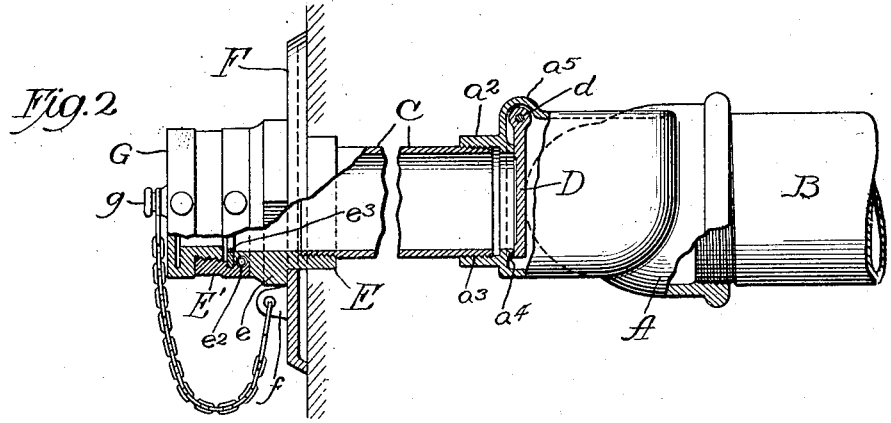
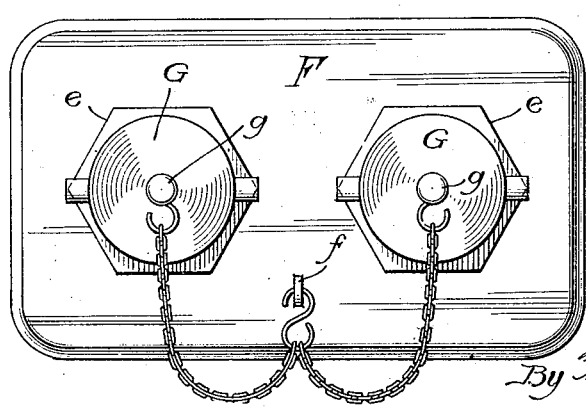
Inventor:
William H. Symonds
By Fisher, Clapp & Soans
Attys.

Patented May 12, 1931

1,804,714

UNITED STATES PATENT OFFICE

WILLIAM H. SYMONDS, OF CHICAGO, ILLINOIS, ASSIGNOR TO W. D. ALLEN MANUFACTURING COMPANY, OF CHICAGO, ILLINOIS, A CORPORATION

STAND PIPE CONNECTION FOR BUILDINGS

Application filed March 4, 1927, Serial No. 172,702. Renewed October 4, 1930.

The present invention has relation more particularly to that class of standpipe connections commonly designated as "Siamese" connections. Such connections are usually located adjacent the street level of a building and comprise a plurality of inlet pipes with hose couplings, these pipes being part of a casing from which leads a single stand pipe to the upper portion of the building. Ordinarily, the casing, which has formed integrally therewith the inlet pipes, is located at the outer face of the building wall, so that such nipples, with the hose couplings attached thereto, project to such considerable distance beyond the face of the building wall as to offer an obstruction and a menace to pedestrians.

The object of the present invention is to provide a construction in which the casing having the inlet and outlet openings therein may be located away from the face of the building, the casing being provided with detachable nipples that will lead to the outer face of the building, where they will be provided with hose couplings that will pass through an escutcheon plate, so that only the plate and the couplings (which are comparatively short) need project beyond the face of the building.

The invention consists in the novel construction hereinafter described, illustrated in the accompanying drawings, and particularly pointed out in the claims at the end of this specification.

Figure 1 is a plan view of a stand pipe connection embodying my invention; Figure 2 is a view in side elevation, parts being broken away; Figure 3 is a view in front elevation.

In the drawing, A designates my improved casing or box that consists of a casting that has formed upon one side thereof an outlet opening provided with interior threads $a$ to engage the exteriorly threaded end of the stand pipe B that may lead to the upper part of the building. As shown in the drawing, the outlet opening is formed at the rear of the casing A, but obviously it may be located at the top or bottom of the casing if preferred. Upon another side of the casing A, there are formed a plurality of inlets $a^2$ that are interiorly threaded, as at $a^3$, to receive the exteriorly threaded inner ends of the inlet nipples C. Within the casing at the inlets $a^2$ are formed the raised valve seats $a^4$ against which are placed the flap valves D that serve to check the backflow of water from the stand pipe B. The casing A is formed with a plurality of offsets $a^5$ to receive the hinged ends $d$ of the valves D.

The inlet nipples C may be formed of any required length, thereby enabling the casing A to be located at any desired point in the wall or other part of the building. Each of the inlet nipples C is exteriorly threaded at its outer end to receive the interiorly threaded inner end of the member E of a hose coupling that will ordinarily be formed of bronze or like material. As shown, the member E of the hose coupling is made with a polygonal flange $e$ adapted to engage the outer face of an escutcheon plate F through which the member E passes and that may bear against the outer face of the building wall. Each of the coupling members E is provided at its outer end with a swivel member E' that may be connected to the reduced outer end of the member E by a wire swivel $e^2$ of familiar construction. The member E' of the coupling is shown as provided with an interior recess adapted to receive a soft rubber washer $e^3$ and this member E' is interiorly threaded to engage the exteriorly threaded reduced portion of a cap G that may be of any suitable construction. Ordinarily, the cap G is formed with a projection $g$ adapted to receive a chain whereby it may be connected to an offset $f$ formed on the outer face of the escutcheon plate F, in a manner well understood. By forming the inlet nipples C separate from the casing A and of any desired length, I am enabled to locate the casing at any convenient point and the extent to which the couplings need project beyond the face of the escutcheon plate is reduced to a minimum.

While I have described what I regard as the preferred embodiment of my invention, it will be understood that the details of construction above set out may be varied without departure from the scope of the invention.

Having thus described my invention, what I claim as new and desire to secure by Letters Patent is—

1. A stand pipe connection for buildings comprising a casing adapted to be disposed horizontally at the inside of a building wall and having an outlet on one side and a plurality of threaded inlets on another side, valves within the casing for controlling said inlets, a plurality of threaded nipples for engaging said inlets and adapted to be disposed through the wall, and hose couplings threaded to the outer ends of said nipples.

2. A stand pipe connection for buildings comprising a casing having an outlet on one side and a plurality of threaded inlets on another side, valves within the casing for controlling said inlets and checking backflow, a plurality of threaded nipples for engaging said inlets and adapted to extend only to the outer surface of the building wall, hose couplings threaded to the outer ends of said nipples, and an escutcheon plate having openings through which said couplings pass.

3. A stand pipe connection for buildings comprising a casing having an outlet on one side and a plurality of threaded inlets on another side with raised valve seats, and valves hinged within the casing and engaging said seats for controlling said inlets, offset chambers being formed in said casing for the hinges of said valves.

4. A stand pipe connection for buildings comprising a casing having formed integrally therewith on one side an interiorly threaded outlet and having formed integrally therewith on another side a plurality of interiorly threaded inlets, nipples exteriorly threaded at both ends and having their inner ends engaging the threads of said inlets, interiorly threaded hose couplings engaging the outer ends of said nipples, and an escutcheon plate having openings through which said hose couplings pass.

5. In combination with a wall of a building; a body piece set into said wall, the inner side of said body piece provided with an opening adapted to receive a pipe connection from the inside of the building, and the outer side of said body piece provided with a plurality of threaded openings accessible from the outside of the building; and nipples with external threads adapted to be screwed into said last mentioned openings from the exterior of said building.

6. A stand pipe connection for buildings comprising a casing having an outlet adapted to be connected to a stand pipe, said casing having a plurality of inlet openings in its outer side nipples threaded into said inlet openings and adapted to extend through the building wall and hose couplings and an escutcheon plate mounted on the outer ends of said nipples substantially as described.

7. A stand pipe connection for buildings comprising a casing having an outlet adapted to be connected to a stand pipe, the outer wall of said casing having a plurality of inlets and integral valve seats for said inlets check valves within the casing engaging said seats, nipples threaded into said inlets and adapted to extend through the building wall, and hose couplings threaded upon the outer ends of said nipples, substantially as described.

8. A stand pipe for buildings comprising a casing adapted to be disposed inside the wall of a building and having an outlet for connection with a stand pipe, the outer wall of said casing having a plurality of inlets and integral valve seats for said inlets, check valves within said casing and engaging said seats, nipples threaded into said inlets and adapted to extend through the building wall, an escutcheon plate and hose couplings threaded on the outer ends of said nipples and adapted to hold said escutcheon plate in position, substantially as described.

WILLIAM H. SYMONDS.